US012592940B2

(12) United States Patent
Wilson

(10) Patent No.:  US 12,592,940 B2
(45) Date of Patent:       Mar. 31, 2026

(54) ATM INTEGRITY MONITOR (AIM) SYSTEM AND METHOD FOR DETECTING CYBER ATTACKS ON ATMS NETWORKS

(71) Applicant: Raytheon Systems Limited, Harlow (GB)

(72) Inventor: Stephen Gilbert Wilson, Barnwood (GB)

(73) Assignee: Raytheon Systems Limited, Harlow (GB)

( * ) Notice: Subject to any disclaimer, the term of this patent is extended or adjusted under 35 U.S.C. 154(b) by 72 days.

(21) Appl. No.: 18/637,168

(22) Filed: Apr. 16, 2024

(65) Prior Publication Data

US 2024/0267394 A1       Aug. 8, 2024

Related U.S. Application Data

(63) Continuation of application No. PCT/GB2022/052622, filed on Oct. 14, 2022.

(30) Foreign Application Priority Data

Oct. 19, 2021   (GB) ...................................... 2114931

(51) Int. Cl.
H04L 9/40              (2022.01)
G08G 5/00              (2025.01)

(52) U.S. Cl.
CPC ........... H04L 63/1416 (2013.01); G08G 5/00 (2013.01)

(58) Field of Classification Search
CPC .............................. H04L 63/1416; G08G 5/00
See application file for complete search history.

(56) References Cited

U.S. PATENT DOCUMENTS

| | | | | |
|---|---|---|---|---|
| 8,344,933 | B1 * | 1/2013 | Kronfeld ............... | G01S 13/953 |
| | | | | 342/25 R |
| 9,310,477 | B1 * | 4/2016 | Sampigethaya ........ | G01S 13/91 |
| 11,017,513 | B1 * | 5/2021 | Yarlagadda .......... | G06V 10/765 |
| 11,095,384 | B2 * | 8/2021 | Anand .................... | H04L 47/28 |
| 2002/0066014 | A1 * | 5/2002 | Dworkin .............. | H04L 9/0643 |
| | | | | 713/168 |
| 2011/0057830 | A1 * | 3/2011 | Sampigethaya ...... | G01S 5/0289 |
| | | | | 342/36 |
| 2014/0327564 | A1 * | 11/2014 | Sampigethaya ......... | G08G 5/25 |
| | | | | 342/32 |
| 2015/0009840 | A1 * | 1/2015 | Pruthi .................... | H04L 43/16 |
| | | | | 370/252 |
| 2016/0021121 | A1 * | 1/2016 | Cui ........................ | H04L 63/20 |
| | | | | 726/1 |

(Continued)

OTHER PUBLICATIONS

"C.C.Silva, Luciano Martins, Manoel P. dos S. Junior, Nadia A. Nassif, Rodolfo de S. Costa", "Performance Verification of VOIP for Terrestrialcommunications and IP Surveillance Data for Air Trafficmanagement", Apr. 2015 (Year: 2015).*

(Continued)

*Primary Examiner* — Darshan I Dhruv

(57)                ABSTRACT

An air traffic management system monitor is provided, wherein the monitor comprises a first sub-monitor configured to monitor a data packet within the ATMS, and provide a first alert if the data packet in the ATMS is at least one of: altered; delayed; and absent. This allows detection of a compromised data packed in the ATMS.

20 Claims, 7 Drawing Sheets

*400*

OBTAIN THE DATA PACKET FROM A FIRST SITE OF THE PLURALITY OF SITES  ~401

HASH THE DATA PACKET OBTAINED FROM THE FIRST SITE TO OBTAIN A FIRST VALUE  ~402

OBTAIN THE DATA PACKET FROM A SECOND SITE OF THE PLURALITY OF SITES  ~403

HASH THE DATA PACKET OBTAINED FROM THE SECOND SITE TO OBTAIN A SECOND VALUE  ~404

COMPARE THE FIRST AND SECOND VALUES  ~405

DETERMINE THE DATA PACKET HAS BEEN ALTERED IF THE FIRST AND SECOND VALUES DO NOT MATCH  ~406

PROVIDE THE FIRST ALERT  ~407

(56) References Cited

U.S. PATENT DOCUMENTS

| | | | |
|---|---|---|---|
| 2016/0112445 A1* | 4/2016 | Abramowitz | G06Q 40/08 |
| | | | 726/23 |
| 2016/0191678 A1* | 6/2016 | Brandeburg | H04L 9/3236 |
| | | | 370/392 |
| 2017/0041331 A1* | 2/2017 | Craig | H04L 63/1441 |
| 2018/0219892 A1* | 8/2018 | Makavy | H04L 51/212 |
| 2019/0058714 A1* | 2/2019 | Joshi | H04L 63/0823 |
| 2019/0268257 A1* | 8/2019 | Zhang | H04L 43/50 |
| 2019/0294464 A1* | 9/2019 | Twitchell, Jr. | H04L 67/1097 |
| 2021/0288747 A1* | 9/2021 | Yu | H04L 1/0003 |

OTHER PUBLICATIONS

International Search Report and Written Opinion of the International Searching Authority dated Jan. 16, 2023 in connection with International Patent Application No. PCT/GB2022/052622, 9 pages.
Combined Search and Examination Report dated Jun. 24, 2022 in connection with United Kingdom Patent Application No. GB2114931. 5, 9 pages.
Silva et al., "Performance Verification of Voip For Terrestrial Communications And IP Surveillance Data For Air Traffic Management," 2015 Integrated Communication, Navigation And Surveillance Conference (ICNS), IEEE, Apr. 2015, 12 pages.
de Riberolles et al., "Characterizing Radar Network Traffic: A First Step Towards Spoofing Attack Detection," 2020 IEEE Aerospace Conference, Mar. 2020, 8 pages.
Casanovas et al., "Vulnerability Of Radar Protocol And Proposed Mitigation," 2015 ITU Kaleidoscope: Trust In The Information Society (K-2015), Dec. 2015, 6 pages.

* cited by examiner

Figure 4A:
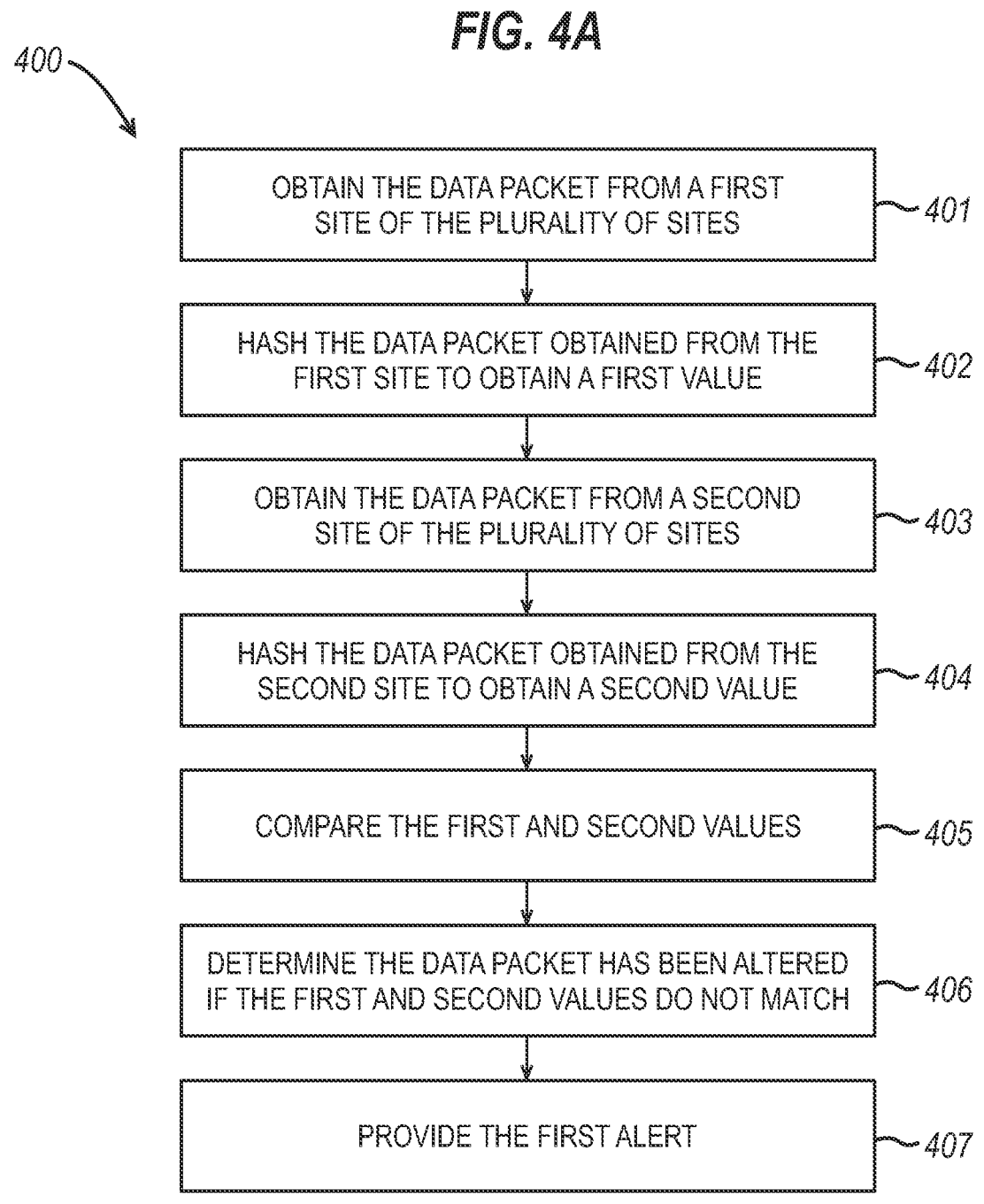

| OBTAIN THE DATA PACKET FROM A FIRST SITE OF THE PLURALITY OF SITES | ~ 401 |

| HASH THE DATA PACKET OBTAINED FROM THE FIRST SITE TO OBTAIN A FIRST VALUE | ~ 402 |

| OBTAIN THE DATA PACKET FROM A SECOND SITE OF THE PLURALITY OF SITES | ~ 403 |

| HASH THE DATA PACKET OBTAINED FROM THE SECOND SITE TO OBTAIN A SECOND VALUE | ~ 404 |

| COMPARE THE FIRST AND SECOND VALUES | ~ 405 |

| DETERMINE THE DATA PACKET HAS BEEN ALTERED IF THE FIRST AND SECOND VALUES DO NOT MATCH | ~ 406 |

| PROVIDE THE FIRST ALERT | ~ 407 |

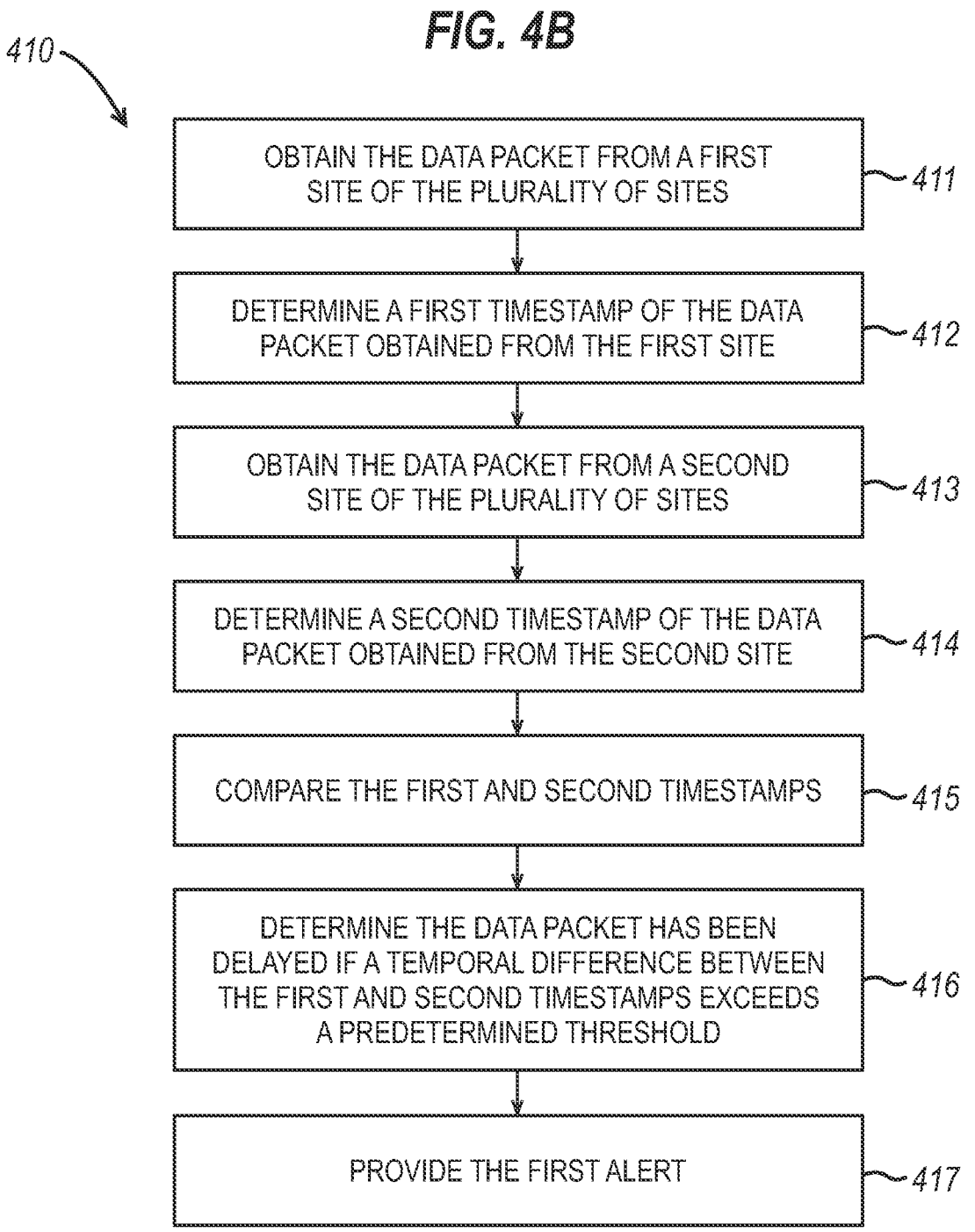

OBTAIN THE DATA PACKET FROM A FIRST SITE OF THE PLURALITY OF SITES — 411

DETERMINE A FIRST TIMESTAMP OF THE DATA PACKET OBTAINED FROM THE FIRST SITE — 412

OBTAIN THE DATA PACKET FROM A SECOND SITE OF THE PLURALITY OF SITES — 413

DETERMINE A SECOND TIMESTAMP OF THE DATA PACKET OBTAINED FROM THE SECOND SITE — 414

COMPARE THE FIRST AND SECOND TIMESTAMPS — 415

DETERMINE THE DATA PACKET HAS BEEN DELAYED IF A TEMPORAL DIFFERENCE BETWEEN THE FIRST AND SECOND TIMESTAMPS EXCEEDS A PREDETERMINED THRESHOLD — 416

PROVIDE THE FIRST ALERT — 417

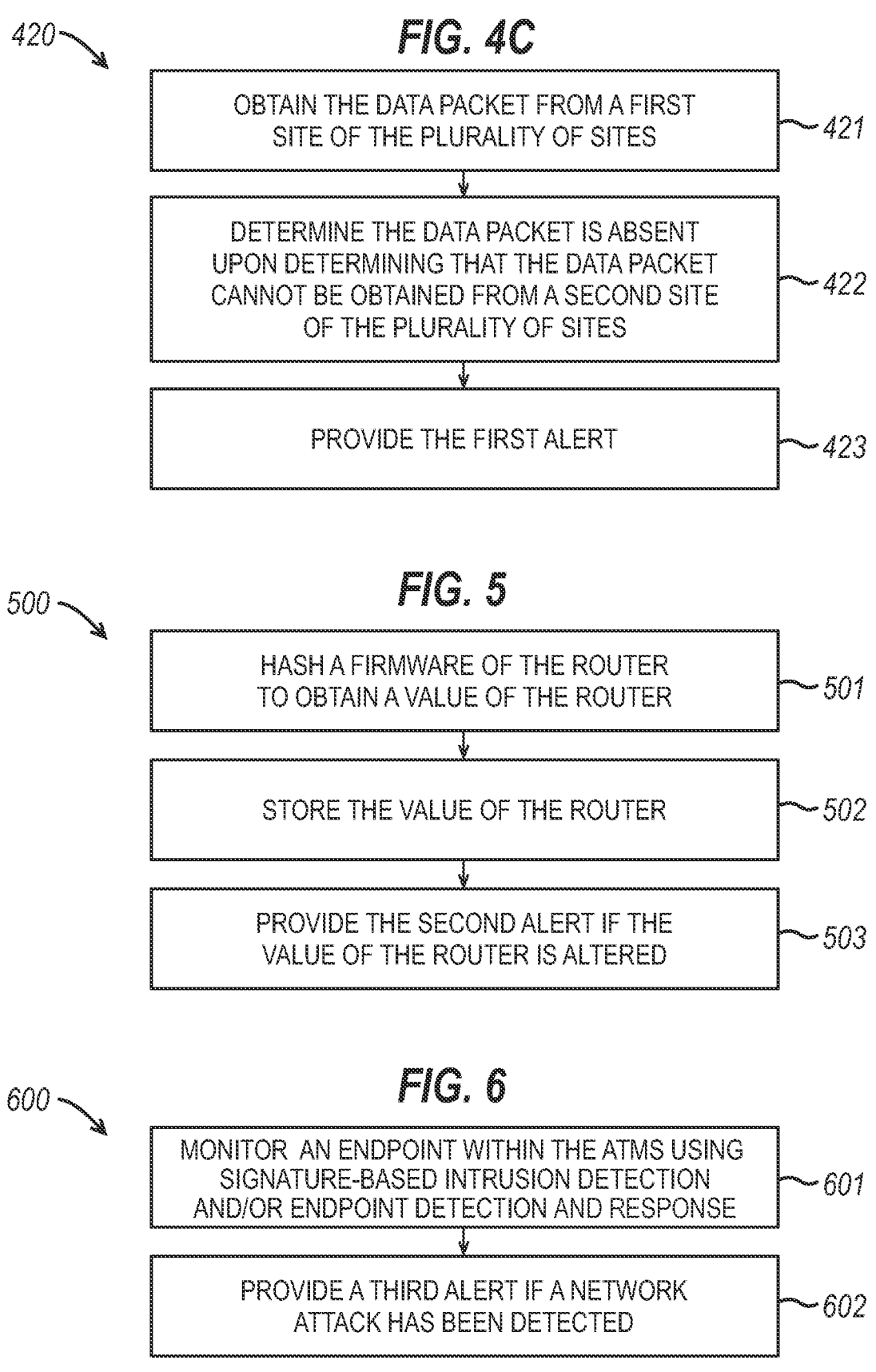

OBTAIN THE DATA PACKET FROM A FIRST
SITE OF THE PLURALITY OF SITES ~421

DETERMINE THE DATA PACKET IS ABSENT
UPON DETERMINING THAT THE DATA PACKET
CANNOT BE OBTAINED FROM A SECOND SITE
OF THE PLURALITY OF SITES ~422

PROVIDE THE FIRST ALERT ~423

HASH A FIRMWARE OF THE ROUTER
TO OBTAIN A VALUE OF THE ROUTER ~501

STORE THE VALUE OF THE ROUTER ~502

PROVIDE THE SECOND ALERT IF THE
VALUE OF THE ROUTER IS ALTERED ~503

MONITOR AN ENDPOINT WITHIN THE ATMS USING
SIGNATURE-BASED INTRUSION DETECTION
AND/OR ENDPOINT DETECTION AND RESPONSE ~601

PROVIDE A THIRD ALERT IF A NETWORK
ATTACK HAS BEEN DETECTED ~602

ATM INTEGRITY MONITOR (AIM) SYSTEM AND METHOD FOR DETECTING CYBER ATTACKS ON ATMS NETWORKS

CROSS-REFERENCE TO RELATED APPLICATION AND PRIORITY CLAIM

This application is a bypass continuation of International Patent Application No. PCT/GB2022/052622 filed on Oct. 14, 2022, which claims the benefit of United Kingdom Patent Application No. 2114931.5 filed on Oct. 19, 2021. Both of these applications are hereby incorporated by reference in their entirety.

TECHNICAL FIELD

The invention relates to a monitor for an air traffic management system, ATMS. In one aspect, a data packet within the ATMS is monitored, and an alert is provided if the data packet has been tampered with. The alert may indicate a cyber-attack on the ATMS.

BACKGROUND

An ATMS provides the infrastructure necessary for the provision of air navigation services. In some jurisdictions, an ATMS is classed as critical national infrastructure, which means it is infrastructure deemed essential for the functioning of the jurisdiction. An Air Navigation Service Provider, ANSP, may implement an AMTS 100 as shown in FIG. 1. The ANSP may use a local site 101 and several remote sites 102 (only two are shown for simplicity). The local site could typically be located at an airport and may include an airport traffic control tower 104 and at least one local site radar 103 (e.g. monopulse secondary surveillance radar, MSSR). The local site is responsible for air surveillance in its vicinity and can track and monitor air traffic within range of the local site's radar(s).

Each remote site includes at least one radar 105 (e.g. monopulse secondary surveillance radar, MSSR) connected to an interrogator 310 (shown in FIG. 3). The interrogator is typically connected to a network switch 311 which is connected to a router 312. Each remote site is responsible for air surveillance in its vicinity and can track and monitor air traffic within range of the remote site's radar(s). The remote site may be "unmanned" (i.e. no onsite personnel). The local site and each remote site can communicate with one another, via the router and appropriate communications links 106 including wired and wireless communications links (e.g. microwave transmission). Locating the remote sites at appropriate geographic sites with respect to the local site means that air surveillance can be provided for an entire geographic region, such as country or part thereof. This way, a realtime map of air traffic in a country or part thereof can be obtained.

The local and remote sites may communicate with each other over respective communication links using a communications protocol to exchange air traffic control messages. One such protocol is All-Purpose Structured Eurocontrol Surveillance Information Exchange, ASTERIX. ASTERIX has been specifically designed to transmit all the information needed, with the smallest data load possible, which assists with the time-critical nature of an ATMS.

Given the time-critical nature of an ATMS, encrypting and or authenticating the ASTERIX data stream would involve additional delays due to encryption/decryption and/ or authentication at the local and remote sites. Whilst an encrypted and/or authenticated ASTERIX data stream would increase the resilience of the ATMS to cyber-attacks, the additional encryption/decryption and/or authentication delays could adversely affect the ability of the ATMS to provide the real-time map. Obtaining and manipulating the ASTERIX data stream either via the communication links or the hardware at the local and remote sites is thus simplified due to lack of encryption and/or authentication.

Similarly, the hardware itself used at the sites may present an opportunity for an unscrupulous actor to launch a cyber-attack. For example, the sites use routers to route data packets (e.g. ASTERIX data stream) within and between sites. If the unscrupulous actor were able to access the router either directly via the site or via the communications link, the router could be compromised to re-route the data packets away from the desired destination and frustrate the real-time mapping of the air traffic. Alternatively, the unscrupulous actor may disable the router remotely, or simply maintain access for a future cyber-attack.

Finally, the local and remote sites use computer terminals 313 running operating systems with known security vulnerabilities. If the unscrupulous actor were able to access these terminals, the security vulnerabilities could be exploited to launch a cyber-attack. Given the networked nature of the local and remote sites, endpoints within the network could provide the unscrupulous actor access to the terminal, or any other part of the network for that matter. Hence, current ATMSs are vulnerable to endpoint attacks that could ultimately be used to launch a cyber-attack against the ATMS.

Existing ATMSs thus provide a number of opportunities to launch a cyber-attack. Given the critical nature of ATMSs, a successful cyber-attack could cause significant damage. Equally, in the absence of a cyber-attack, any underlying security measures must not adversely affect the real-time operation of the ATMS, which in certain circumstances could result in significant damage. Thus, there is a need to increase the resilience of ATMSs against cyber-attacks without adversely affecting their low latency real-time mapping of air traffic in a given geographic region.

SUMMARY

In a first aspect, there is provided an air traffic management system, ATMS, monitor, the monitor comprising: a first sub-monitor configured to monitor a data packet within the ATMS; and provide a first alert if the data packet in the ATMS is at least one of: altered; delayed; and absent. This allows detection of a compromised data packed in the ATMS.

Preferably, the first sub-monitor is configured to obtain the data packet from a first site of the ATMS, hash the data packet obtained from the first site to obtain a first value, obtain the data packet from a second site of the ATMS, hash the data packet obtained from the second site to obtain a second value, compare the first and second values, determine the data packet has been altered if the first and second values do not match, and provide the first alert. This indicates that the data packet has been accessed and manipulated after transmission from the first site and before reception at the second site.

Preferably, the first sub-monitor is configured to obtain the data packet from a first site of the ATMS, determine a first timestamp of the data packet obtained from the first site, obtain the data packet at a second site of the ATMS, determine a second timestamp of the data packet obtained from the second site, compare the first and second timestamps, determine the data packet has been delayed if a temporal difference between the first and second timestamps exceeds a predetermined threshold, and provide the first alert. This indicates that the low latency performance of the ATMS has exceeded normal operational thresholds. The delay of the data packet after transmission from the first site and before reception at the second site is thus unexplained and requires further attention.

Preferably, the first sub-monitor is configured to obtain the data packet from a first site of the ATMS, determine the data packet is absent upon determining that the data packet cannot be obtained from a second site of the ATMS, and provide the first alert. This indicates that the data packet has been lost and requires further attention.

Preferably, the first sub-monitor obtains the data packet from the first and second site via respective passive taps. This means that the flow of data on the ATMS itself is not hindered whilst monitoring for a compromised data packet.

Preferably, the ATMS comprises a plurality of sites, and wherein the first sub-monitor is configured to obtain the data packet from each of the plurality of sites. This allows a compromised packet to be detected throughout the ATMS.

Preferably, the data packet comprises radar surveillance data. Monitoring this type of data means any compromised data can be detected before the ATMS' ability to monitor air traffic in real time is adversely affect.

Preferably, the ATMS comprises a second sub-monitor, wherein the second sub-monitor is configured to monitor a router within the ATMS, and provide a second alert if the router has been altered. This allows detection of a compromised router.

Preferably, the second sub-monitor is configured to store a value of the router, and provide the second alert if the value of the router is altered. This allows a compromised router to be detected with minimal delay.

Preferably, the value of the router is generated from a hash of the router's firmware. This allows any change, no matter how minor (e.g. a single bit) in the router's firmware to be detected.

Preferably, the ATMS comprises a plurality of sites, and the second sub-monitor is configured to monitor a router at each of the plurality of sites. This allows any compromised router within the ATMS to be detected.

Preferably, the ATMS comprises a third sub-monitor, wherein the third sub-monitor is configured to monitor an endpoint within the ATMS, and provide a third alert if a network attack has been detected. This allows unauthorized network access to be detected.

Preferably, the third sub-monitor is configured to use signature-based intrusion detection and/or endpoint detection and response to detect a network attack. This allows the specific type of network to be detected.

Preferably, the ATMS comprise a plurality of sites, wherein each site comprises a router and switch, wherein the first sub-monitor establishes a first feed to a point between the router and switch at each site to obtain a respective data packet, the second sub-monitor establishes a second feed to a router at each site to obtain a respective value of the router, and the third sub-monitor establishes a third feed to a point between the router and switch at each site to obtain a respective data packet. This means the generated alerts correspond to critical components of each site.

Preferably, the ATMS monitor is further configured to generate a high priority alert if the first, second, and third alerts are generated simultaneously or overlap over a period of time. This is strongly indicative of a cyber-attack being initiated or in progress.

In a second aspect, there is provided a computer-implemented method for monitoring an air traffic management system, ATMS, the method comprising: performing a first sub-monitoring process to monitor a data packet within the ATMS; and providing a first alert if the data packet in the ATMS is at least one of: altered; delayed; and absent. This allows detection of a compromised data packed in the ATMS.

Preferably, performing the first sub-monitoring process comprises obtaining the data packet from a first site of the ATMS, hashing the data packet obtained from the first site to obtain a first value, obtaining the data packet from a second site of the ATMS, hashing the data packet obtained from the second site to obtain a second value, comparing the first and second values; determining the data packet has been altered if the first and second values do not match, and providing the first alert. This indicates that the data packet has been accessed and manipulated after transmission from the first site and before reception at the second site.

Preferably, performing the first sub-monitoring process comprises obtaining the data packet from a first site of the ATMS, determining a first timestamp of the data packet obtained from the first site, obtaining the data packet from a second site of the ATMS, determining a second timestamp of the data packet obtained from the second site, comparing the first and second timestamps, determining the data packet has been delayed if a temporal difference between the first and second timestamps exceeds a predetermined threshold, and providing the first alert. This indicates that the low latency performance of the ATMS has exceeded normal operational thresholds. The delay of the data packet after transmission from the first site and before reception at the second site is thus unexplained and requires further attention.

Preferably, performing the first sub-monitoring process comprises obtaining the data packet from a first site of the ATMS, determining the data packet is absent upon determining that the data packet cannot be obtained from a second site of the ATMS, and providing the first alert. This indicates that the data packet has been lost and requires further attention.

Preferably, performing the first sub-monitoring process comprises obtaining the data packet from the first and second site via respective passive taps. This means that the flow of data on the ATMS itself is not hindered whilst monitoring for a compromised data packet.

Preferably, the ATMS comprises a plurality of sites, and wherein performing the first sub-monitoring process comprises obtaining the data packet from each of the plurality of sites. This allows a compromised packet to be detected throughout the ATMS.

Preferably, the data packet comprises radar surveillance data. Monitoring this type of data means any compromised data can be detected before the ATMS' ability to monitor air traffic in real time is adversely affect.

Preferably, the method further comprises, performing a second sub-monitoring process to monitor a router within the ATMS, and providing a second alert if the router has been altered. This allows any compromised router within the ATMS to be detected.

Preferably, performing the second sub-monitoring process comprises storing a value of the router, and providing the second alert if the value of the router is altered. This allows a compromised router to be detected with minimal delay.

Preferably, the value of the router is generated from a hash of the router's firmware. This allows any change, no matter how minor (e.g. a single bit) in the router's firmware to be detected.

Preferably, the ATMS comprises a plurality of site, and the second sub-monitor is configured to monitor a router at each of the plurality of sites. This allows any compromised router within the ATMS to be detected.

Preferably, the method comprises performing a third sub-monitoring process to monitor an endpoint within the ATMS, and providing a third alert if a network attack has been detected. This allows unauthorized network access to be detected.

Preferably, performing the third sub-monitoring process comprises using signature-based intrusion detection and/or endpoint detection and response to detect a network attack. This allows the specific type of network to be detected.

Preferably, the ATMS comprises a plurality of sites, wherein each site comprises a router and switch, wherein the first sub-monitor establishes a first feed to a point between the router and switch at each site to obtain a respective data packet, the second sub-monitor establishes a second feed to a router at each site to obtain a respective value of the router, and the third sub-monitor establishes a third feed to a point between the router and switch at each site to obtain a respective data packet. This means the generated alerts correspond to critical components of each site.

Preferably, the method comprises generating a high priority alert if the first, second, and third alerts are generated simultaneously or overlap over a period of time. This is strongly indicative of a cyberattack being initiated or in progress.

In a third aspect, there is provided a computer readable medium comprising instructions which when executed by a processor, causes the processor to carry out the method of the second aspect.

BRIEF DESCRIPTION OF DRAWINGS

FIGS. 4a-c show processes carried out by the ATMS monitor to raise an alert.

FIG. 5 shows a process carried out by the ATMS monitor to raise an alert.

FIG. 6 shows a process carried out by the ATMS monitor to raise an alert.

DETAILED DESCRIPTION

Figure 2:
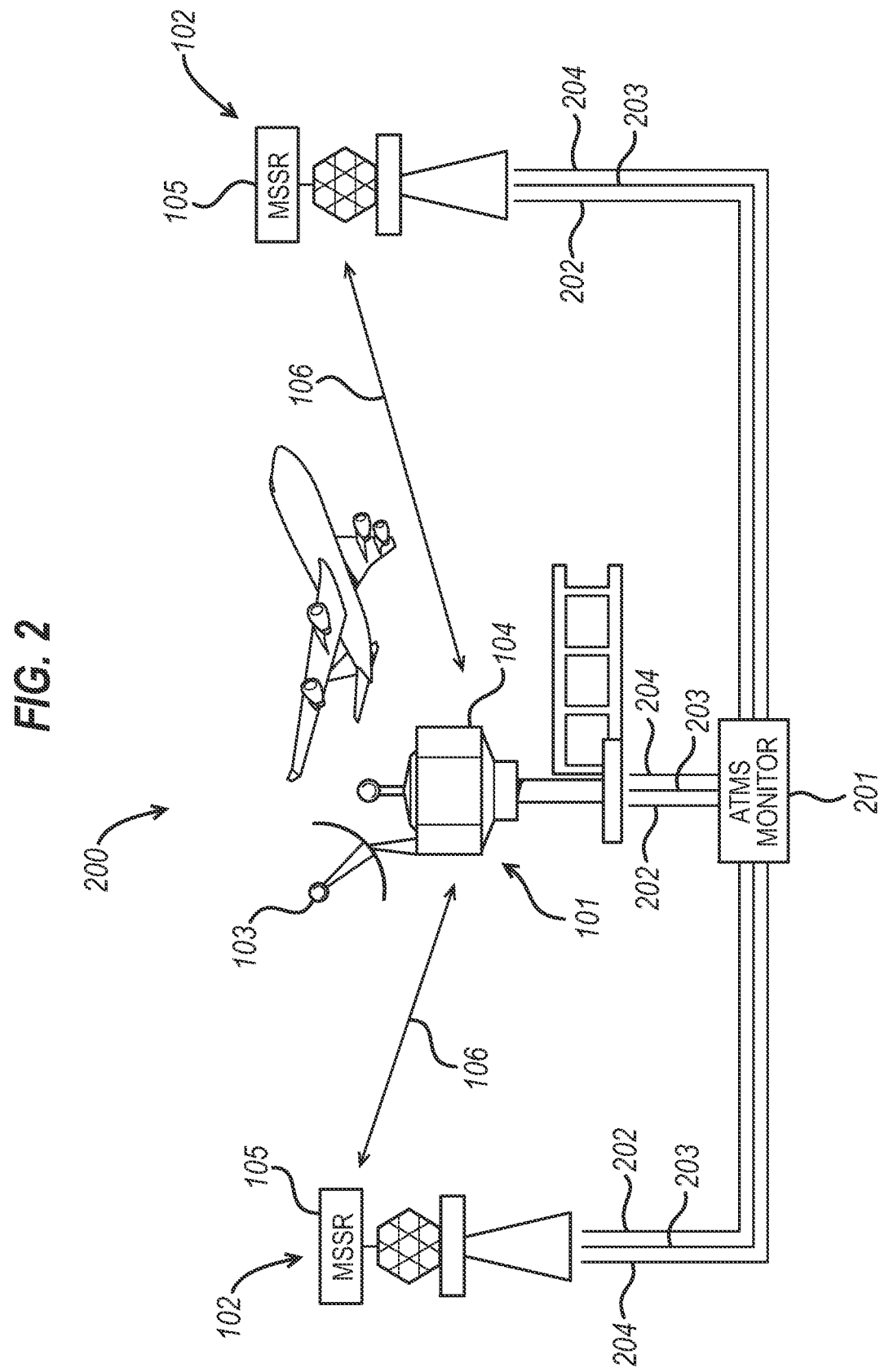
FIG. 2 shows the ATMS monitor can be used with a known ATMS.
Figure 3:
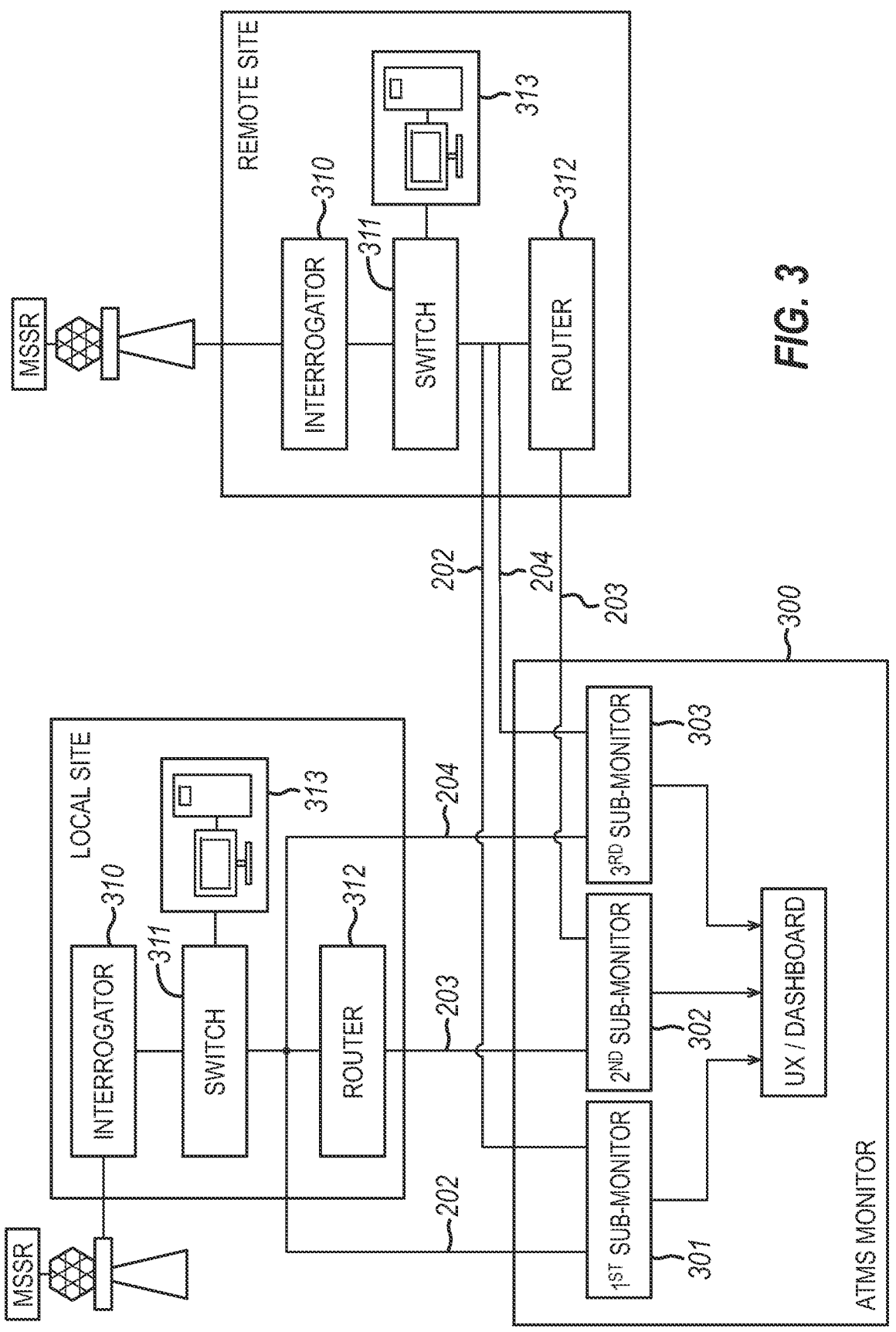
FIG. 3 shows the ATMS monitor in more detail.

With reference to the drawings, and as best shown in FIGS. 2 and 3, there is shown an ATMS monitor. FIG. 2 shows how 200 the ATMS monitor can be used with a known ATMS, whereas FIG. 3 shows the ATMS monitor in more detail.

The ATMS monitor establishes respective communication links 202, 203, 204 with each of the remote 105 and local 101 sites. This allows the ATMS monitor to access data flows between the local and remote sites. Additionally, the ATMS monitor can access hardware located at each site. It will be appreciated that the ATMS monitor may be implemented in a number of ways. For example, the ATMS monitor may be discrete hardware that is deployed at any one of the local or remotes sites, and for example at the local site. Alternatively, the ATMS monitor may reside in a cloud computing environment. A combination of discrete hardware and a cloud computing environment may also be used. Regardless of the implementation chosen, the ATMS monitor is configured to establish dedicated communication links with the local site and each of the remote sites. The dedicated communication links could be wired links, wireless links, or a combination of both wired and wireless links. Similarly, packet-switched networks, circuit-switched networks, or a combination of both packet switched networks and circuit-switched networks may be used to establish the links.

The ATMS monitor 300 has three sub monitors, denoted as the first 301, second 302, and third 303 sub-monitors. The terms "first", "second", and "third" are merely nominal and serve to highlight respective functions carried out by the ATMS monitor.

Figure 1:
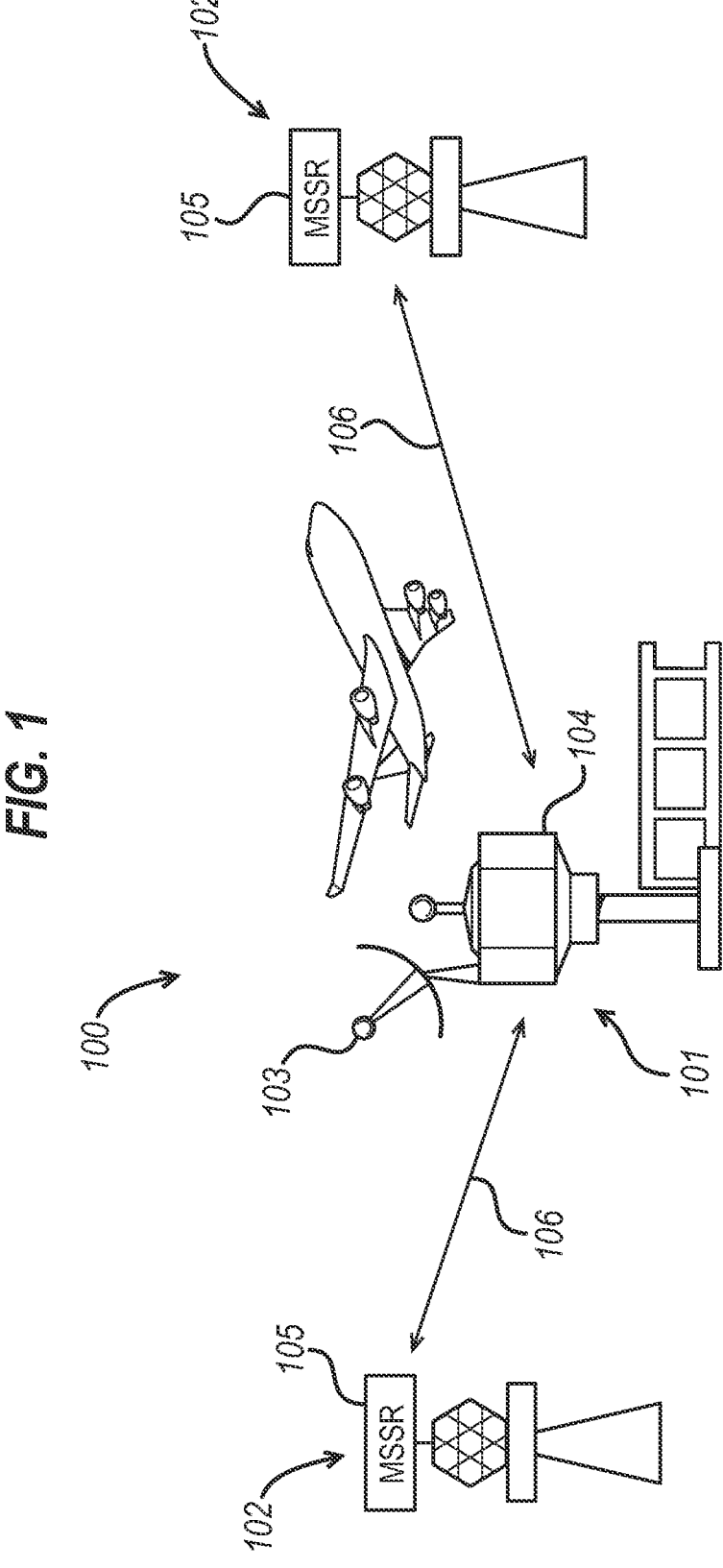
FIG. 1 shows a known ATMS.

The first-sub monitor uses its respective communication links to each of the local and remote sites to establish respective first feeds 202 therewith. In particular, the first feed from each of the local and remote sites obtains a flow of data to/from that site. This may be achieved by the first sub-monitor establishing a passive tap at each of the local and remote sites. This way, the first sub-monitor can obtain a copy of all the data that is transmitted between the local and remote sites without adversely affecting the existing flow of data between the local and remote sites (i.e. the data that flows over the standard connection 106 to the sites as shown in FIGS. 1 and 2). This ensures that the realtime mapping of ATMS is maintained. The first feeds in principle may connect to any location within the respective sites. In the example shown, the feeds are taken from the networking elements, and in particular between the router and the switch at each site.

The first sub-monitor is further configured to identify and extract each data packet of the data flow. The first sub-monitor may optionally filter each data packet prior to further analysis. For example, the data packets typically comprise radar surveillance data communicated using a relevant protocol such as ASTERIX. Within ASTERIX, each message may be categorized according to particular type of radar surveillance information (e.g. Cat 21: ADS-B messages; Cat 34: MSSR Service Messages; Cat 48: MSSR Target Reports; Cat 253: Remote station monitoring and control information). Some of these categories may be deemed more critical that other should the underlying data packets be compromised. Therefore, the first sub-monitor may only submit certain data packets for further analysis depending on the category of the data packets. This way, compromised data packets that are critical to the functioning of the ATMS may be identified as soon as possible. Additionally or alternatively, the data packet may comprise underlying control and/or maintenance data.

The first sub-monitor performs the process 400 shown in FIG. 4a. A data packet is obtained 401 at the first sub-monitor via the first feed from a first site (i.e. either the local or remote site). Then, a hash function is applied 402 to the data portion of the data packet to obtain a first value. Hash functions are well known and typically map variable length inputs to a unique output value of a fixed length. A desirable hash function should perform the mapping process efficiently in terms of both time taken and computational expense, and ensure that each input generates a unique output that is then stored in an appropriate format (e.g. a look-up table). The first feed to the first site is thus used to generate a first value for each data packet that is obtained at the first site.

The data packet that was obtained from the first site (e.g. via a passive tap) will also be transmitted to or have been received from another site. The same data packet can therefore be obtained 403 from a second site (i.e. the other one of the local or remote sites) via the respective first feed from the second site. The same hash function that was applied to the data portion of the data packet obtained at the first site is applied 404 to the data portion of data packet that is obtained from the second site to generate a second value. The first feed to the second site is thus used to generate a second value for each data packet that is obtained at the second site. The first and second values for the data packet obtained from the first and second sites respectively are compared 405, for example by adding the second value to a look-up table used to store the first value. If the first and second values match, this indicates that data packet has been unaltered. However, if the first and second values do not match, it is determined 406 that the data packet has been altered, and an alert is provided 407. The process of FIG. 4a thus allows determination that a data packet has been altered when moving between sites. The alert may be provided via a user interface front end for the ATMS monitor. Alternatively, the alerts may be notified directly to the ATMS, such as the local site to attract the attention of relevant personnel to take appropriate action. In any case, a log of the alerts is stored by the ATMS monitor for subsequent analysis, such as determining whether the alteration of the data packet is indicative of a cyber-attack.

There are a number of ways that the same data packet can be identified at the second site. One example may analyze a sequence number of the data packet itself. A sequence number may be used in certain data packets, such as those transmitted using the Transmission Control Protocol, TCP. Comparing sequence numbers of data packets obtained at the first and second sites allows the same packet to be obtained at the second site. TCP is typically used in the ATMS with data that is less time sensitive, such as control and/or maintenance data. Another example may analyze all data packets obtained within a given time window. For example, 100 data packets may be obtained from the first site within a 10 second window. These 100 data packets will generate 100 unique first values in order when the hash function is applied at the first site. Assuming the 100 data packets are obtained at the second site in the order they were obtained at the first site, the 100 unique second values can be compared in the order they are generated with the order of 100 unique first values. However, if the 100 data packets are received out of order at the second site, the time window can be used to constrain the comparison. Assuming the 100 unique second values generated at the second site in the time window have counterparts in the 100 unique first values generated at the first site in the time window, irrespective of order, it can be concluded that the data packets in this time window have not been altered. This may be useful when the data packets are transmitted using the User Datagram Protocol, UDP. UDP is typically used in the ATMS with data that is extremely time sensitive, such as radar surveillance data (e.g. ASTERIX). It will be appreciated that the number of packets and related time window can be selected as appropriate. In a further example, both the sequencing information and the time window constrained analysis may be combined to increase confidence that the same data packets are being identified for comparison.

Although the example of comparing hashes has been used, other means to compare the packets are envisaged. For example, instead of hashing each packet, the packet could be assigned a unique id at each of the first and second sites and stored in respective databases. Differences in this unique id would flag an alert.

Whilst the process of FIG. 4a refers to first and seconds sites, it will be appreciated that numerous sites may be used by the first sub-monitor when comparing data packets. For example, the same data packets from five sites can be hashed by the first sub-monitor to derive five respective values. Unless these five values match, an alert is raised to indicate that the data packet has been altered. If the value generated from the hashing function at one site is repeatedly at odds with the values generated from the same hashing function at the other sites, this can assist in identifying how and where the data packet is being altered. This process is useful when analyzing data other than radar surveillance data (e.g. ASTERIX), which is typically sent between a local and a related remote site, and thus only requires data to be hashed at the local and remote sites. For example, underlying signaling or control data common to all sites could be monitored across multiple sites. The ATMS monitor can be programmed to automatically carry out such further analysis and provide an updated alert with the additional information.

Additionally or alternatively to the process of FIG. 4a, the first sub-monitor performs the process 410 shown in FIG. 4b. A data packet is obtained 411 at the first sub-monitor via the first feed from a first site (i.e. one of the local or remote sites). A first timestamp is determined 412 for the data packet and stored in an appropriate format (e.g. look-up table). As mentioned above, the data packet that was obtained from the first site (e.g. via a passive tap) will also be transmitted to or have been received from another site. The same data packet can therefore be obtained 413 from a second site (i.e. another one of the local or remote sites different from the first site) via the respective first feed to the second site. A second timestamp is determined 414 for the data packet obtained from the second site. The first and second timestamps for the data packet obtained from the first and second sites respectively are compared 415, for example by adding the second timestamp to a look-up table used to store the first timestamp. If it is determined 416 that a temporal difference between the first and second timestamps exceeds a predetermined threshold, an appropriate alert is raised 417 in the same way as described above. The predetermined threshold can be freely chosen but in all instances should be set above a period of time that would account for normal latency within the ATMS. The larger the predetermined threshold, the more likely the delay warrants further investigation (i.e. one explanation for the delay is that the data packet has been intercepted, potentially for malicious use). The smaller the predetermined threshold, the less likely the delay warrants further investigation since it could be due to a minor network spike.

Whilst the process of FIG. 4b refers to first and seconds sites, it will be appreciated that numerous sites may be used by the first sub-monitor when comparing delays in data packets. For example, the same data packet that is transmitted along five sites in series can be used to establish a delay between each site and the previous site from which the data packet was sent to give four respective delays. In such an implementation, the predetermined threshold may vary between adjacent sites to account for typical latency between adjacent sites. If the delay between two adjacent sites is repeatedly exceeding the predetermined threshold more frequently than other adjacent sites, this can assist in identifying how and where the data packet is being delayed. Similar to above, this process is useful when analyzing data other than radar surveillance data (e.g. ASTERIX), which is typically sent between a local and a related remote site, and thus only requires data to be timestamped at the local and remote sites. For example, underlying signaling or control data common to all sites could be monitored across multiple sites. The ATMS monitor can be programmed to automatically carry out such further analysis and provide an updated alert with the additional information.

Additionally or alternatively to the processes of FIG. 4a and/or FIG. 4b, the first sub-monitor performs the process 420 shown in FIG. 4c. A data packet is obtained 421 at the first sub-monitor via the first feed from a first site (i.e. one of the local or remote sites) and stored in an appropriate format (e.g. a look-up table) As mentioned above, the data packet that was obtained from the first site (e.g. via a passive tap) will also be transmitted to or have been received from another site. The same data packet can therefore be obtained from a second site (i.e. another one of the local or remote sites different from the first site) via the respective first feed to the second site. However, in the event the same data packet cannot be obtained from the second site, even after significantly exceeding normal latency, it is determined 422 that the data packet is absent since it cannot be obtained from the second node. An appropriate alert is raised 423 in the same way as described above. One explanation for the absent data packet is that it has been intercepted, potentially for malicious use. Further investigation is warranted. It is known that networks drop data packets. Therefore the process of FIG. 4c may optionally involve the step of triggering the alert under certain conditions. For example, a series of absent data packets may be required before triggering an alert. Alternatively, a periodic pattern in detecting absent packets make trigger the alert. Alternatively, when data packets of a certain category are repeatedly dropped, e.g. critical ATMS data, the alert may be triggered.

Similar to the processes of FIGS. 4a and 4b, whilst the process of FIG. 4c refers to first and seconds sites, it will be appreciated that numerous sites may be used by the first sub-monitor when determining absent data packets. For example, the same data packet that would normally be transmitted along five sites in series could be tracked to ensure it is not absent at each site. Assuming data packets are repeatedly absent when moving between the same pair of adjacent sites, this can assist in identifying how and where the data packet is no longer successfully being sent/received. Again, similar to above, this process is useful when analyzing data other than radar surveillance data (e.g. ASTERIX), which is typically sent between a local and a related remote site, and thus only requires data to be detected at the local and remote sites. For example, underlying signaling or control data common to all sites could be monitored across multiple sites. The ATMS monitor can be programmed to automatically carry out such further analysis and provide an updated alert with the additional information.

As mentioned above, the processes of FIGS. 4a, 4b, and 4c may be used independently or in any combination. This allows the alerts to provide as much or as little information as desired when triggering an alert. If one packet is tracked between a series of sites, determining that it may have been alerted between one pair of adjacent sites, delayed between another pair of adjacent sites and absent at a second site of yet another pair of sites, this is highly indicative of malicious activity that warrants further investigation and a high priority alert is provided. Conversely, the same data packet only experiencing a minor delay between one set of adjacent sites would trigger provision of a low priority alert.

The second-sub monitor uses its respective communication links to each of the local and remote sites to establish respective second feeds 203 therewith. In particular, the second feed from each of the local and remote sites connects to a router at that site. This way, the second sub-monitor can actively monitor the state of each router at each site and provide an alert when the router has been altered. One way this can be achieved is for the second sub-monitor to perform the process 500 shown in FIG. 5. A first value of the router is obtained 501 at the second sub-monitor via the second feed from a first router at a first site (i.e. one of the local or remote sites). This first value of the router can be stored 502 in an appropriate format (e.g. look-up table). The first value of the router can be generated from applying a hash function to the first router's firmware. By periodically generating the first value of the router, any change in the first value of the router indicates that the router's firmware has been altered. An appropriate alert 503 is raised in the same way described above. It may be the case that the router's firmware has been altered as part of a routine authorized update, which can be verified. The ATMS can be programmed to request such verification, for example communication with an authorized firmware log maintained at the local site. However, in absence of such a verification, the alteration of the firmware warrants further verification, and the alert indicates that the firmware alteration has not been verified. This process can be initiated when the router sends its firmware either automatically or in response to a query that is picked up by the passive tap.

Although the hashing function will detect any change in the router's firmware, no matter how minor (e.g. a single bit), the second sub-monitor may be configured to further analyze the firmware alteration. The second sub-monitor may deduce that the alteration involves modification of routing tables which may be indicative of a cyber-attack. Alternatively or additionally, the second sub-monitor may deduce that the router's network address translation settings have been changed to open several ports, which again may be indicative of a cyber-attack. The alert can be updated with this further information concerning the alteration of the router's firmware. The second-sub-monitor carries out the process of FIG. 5 for each router at each site so that all the routers used in the ATMS are monitored for firmware alterations.

The third-sub monitor uses its respective communication links to each of the local and remote sites to establish respective third feeds 204 therewith. In particular, the third feed from each of the local and remote sites obtains a flow of data to/from that site. This may be achieved by the third submonitor establishing a passive tap at each of the local and remote sites. This way, the third submonitor can obtain a copy of all the data that is transmitted between the local and remote sites without adversely affecting the existing flow of data between the local and remote sites (i.e. that data that flows over the standard connection to the sites as shown in FIG. 2). This ensures that the realtime mapping of ATMS is maintained. The third feeds in principle may connect to any location within the respective sites. In the example shown, the third feeds are taken from the networking elements, and in particular between the router and the switch at each site. This allows network attacks to be detected before they reach a terminal at each site running an operating system with known security vulnerabilities.

Where the endpoints are located is a matter of implementation when setting up the ATMS so the third sub-monitor, rather than directly monitor the endpoints themselves (which can change in real time), instead looks for patterns in the data flow at each of the sites that can be indicative of endpoint network attacks. One way this can be achieved is for the third sub-monitor to perform the process 600 shown in FIG. 6. The third sub-monitor analyses the data flow obtained from a first-site (i.e. one of the local or remote sites). The third sub-monitor applies 601 signature-based intrusion detection and/or endpoint detection in response to the data flow and the data packets therein to detect network attacks. The results of the signature-based intrusion detection and/or endpoint detection and response are stored in a log. If a known intrusion signature and/or threat pattern is detected in the log, an appropriate alert 602 is raised in the same way described above. Signaling such an alert may allow pre-emptive action to be taken before a terminal running an operation system with known vulnerabilities is compromised. The third-sub-monitor carries out the process of FIG. 6 for each site so that all the endpoints are monitored for endpoint based network attacks. This way, a compromised site can be temporarily isolated from the ATMS should the network attack be local to that site, so as to prevent the network attack propagating across the entire ATMS. This process can be carried out when endpoints send respective logs/alert either automatically or in response to a query that is picked up by the passive tap.

The ATMS monitor may use the alerts independently from the first, second, and third sub-monitors. Alternatively, the alerts generated by the first, second, and third sub-monitors may be combined to generate a further alert of the highest priority. If first, second, and third sub-monitors generates alerts simultaneously over a period of time, this is strongly indicative of a cyber-attack being initiated or occurring. Appropriate action can be taken. Alternatively, alerts being generated from two of the first, second, and third sub-monitors may be assigned a high priority.

Figure 7:
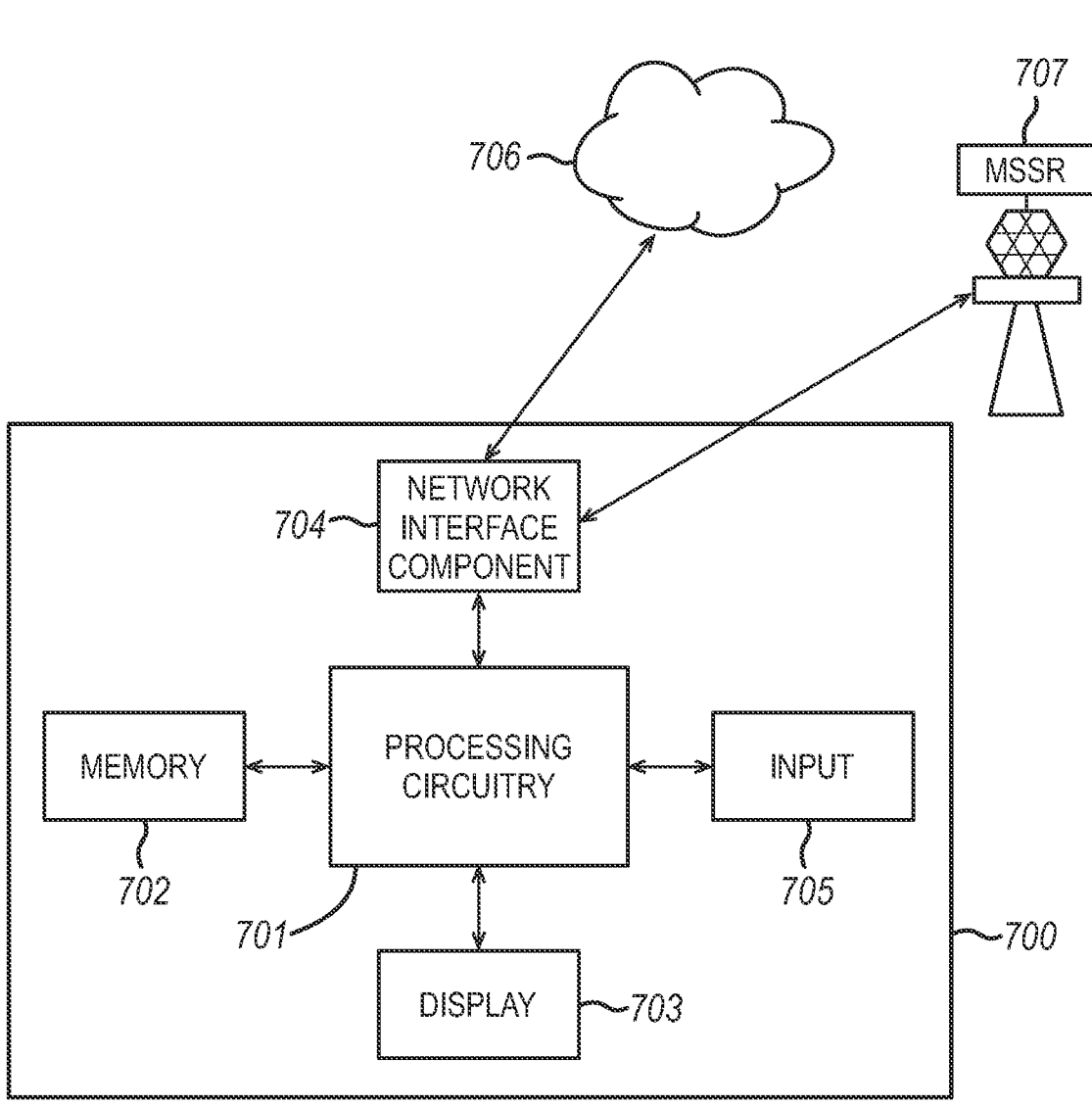
FIG. 7 shows a hardware implementation of the ATMS monitor.

FIG. 7 shows an exemplary electronic device 700 that may be used to implement the ATMS monitor. As mentioned above, the ATMS monitor may use discrete hardware that is deployed at any one of the local or remotes sites, and for example at the local site. Alternatively, the ATMS monitor may reside in a cloud computing environment. A combination of discrete hardware and a cloud computing environment may also be used. Hence, each of the components shown in FIG. 7 maybe implemented using local or remote hardware a combination of both. The electronic device comprises processing circuitry 701 (such as a microprocessor) and a memory 702. Electronic device may also comprise one or more of the following subsystems: a display 703, a network interface 704, and an input 705.

Processing circuitry may control the operation of the electronic device and the connected subsystems to which the processing circuitry is communicatively coupled. Memory may comprise one or more of random access memory (RAM), read only memory (ROM), non-volatile random access memory (NVRAM), flash memory, other volatile memory, and other non-volatile memory.

Display 703 may be communicatively coupled with the processing circuitry, which may be configured to cause the display to output images representative of the ATMS monitor processes described above. The display may comprise a touch sensitive interface, such as a touch screen display. The display may be used to interact with software that runs on the processor of the electronic device. The touch sensitive interface permits a user to provide input to the processing circuitry via a discreet touch, touches, or one or more gestures for controlling the operation of the processing circuitry and the functions described herein. It will be appreciated that other forms of input interface may additionally or alternatively be employed for the same purpose, such as the input which may comprise a keyboard or a mouse at the input device.

Although microwave links are commonly used in an ATMS, the networking interface may also be one or more long-range RF transceivers that are configured to operate according to communication standards such as LTE, UMTS, 3G, EDGE, GPRS, GSM, and Wi-Fi. Alternatively, the network interface may use a wired link such as Ethernet, or optical fiber.

The electronic device may be configured to communicate via the network interface with a network 706. Network may be a wide area network, such as the Internet, or a local area network. Electronic device may be further configured to communicate via the network interface and network with one or more systems, such as site 707 similar to the local and remote sites described above.

Unless otherwise indicated each embodiment as described herein may be combined with another embodiment as described herein.

The methods/processes described herein may be performed by software in machine readable form on a tangible storage medium e.g. in the form of a computer program comprising computer program code means adapted to perform all the steps of any of the methods/processes described herein when the program is run on a computer (e.g. electronic device 701) and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods/processes described herein may be carried out in any suitable order, or simultaneously where appropriate. Additionally, individual blocks may be deleted from any of the methods/processes without departing from the spirit and scope of the subject matter described herein. Aspects of any of the examples described above may be combined with aspects of any of the other examples described to form further examples without losing the effect sought. Any of the module described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

What is claimed is:

1. An air traffic management system (ATMS) monitor, the ATMS monitor comprising:
at least one processor;
a first sub-monitor implemented within the at least one processor and configured to:
monitor for a data packet within an ATMS; and
monitor for an alteration to the data packet;
wherein, to monitor for the alteration to the data packet, the first sub-monitor is configured to:
obtain the data packet from a first site of the ATMS;
hash the data packet obtained from the first site to obtain a first value;
obtain the data packet from a second site of the ATMS;
hash the data packet obtained from the second site to obtain a second value;
compare the first and second values;
determine the data packet has been altered in response to determining the first and second values do not match; and
provide a first alert in response to the alteration of the data packet; and
a second sub-monitor configured to:
monitor a router within the ATMS; and
provide a second alert in response to determining that the router has been altered.

2. The ATMS monitor of claim 1, wherein the first sub-monitor is further configured to:
at least one of:
monitor for a delay of the data packet at the first site and at the second site; or
monitor for an absence of the data packet at the first site or at the second site; and
provide the first alert in response to at least one of the delay of the data packet or the absence of the data packet as detected by the first sub-monitor.

3. The ATMS monitor of claim 2, wherein, to monitor for the delay of the data packet, the first sub-monitor is configured to:
obtain the data packet from the first site of the ATMS;

determine a first timestamp of the data packet obtained from the first site;
obtain the data packet from the second site of the ATMS;
determine a second timestamp of the data packet obtained from the second site;
compare the first and second timestamps; and
determine the data packet has been delayed in response to determining that a temporal difference between the first and second timestamps exceeds a predetermined threshold.

4. The ATMS monitor of claim 2, wherein, to monitor for the absence of the data packet, the first sub-monitor is configured to:
obtain the data packet from the first site of the ATMS;
determine the data packet cannot be obtained from the second site of the ATMS; and
determine the data packet is absent from the second site responsive to the determination that the data packet cannot be obtained from the second site of the ATMS.

5. The ATMS monitor of claim 1, wherein the first sub-monitor is configured to obtain the data packet from first and second sites of the ATMS via respective passive taps.

6. The ATMS monitor of claim 1, wherein:
the ATMS comprises a plurality of sites, and
the first sub-monitor is configured to obtain the data packet from each of the plurality of sites of the ATMS.

7. The ATMS monitor of claim 1, wherein the second sub-monitor is configured to:
store a value of the router; and
provide the second alert in response to determining that the value of the router is altered.

8. The ATMS monitor of claim 7, wherein the value of the router is generated from a hash of firmware of the router.

9. The ATMS monitor of claim 1, wherein:
the ATMS comprises a plurality of sites, and
the second sub-monitor is configured to monitor the router at each of the plurality of sites of the ATMS.

10. The ATMS monitor of claim 1, further comprising a third sub-monitor configured to:
monitor an endpoint within the ATMS; and
provide a third alert in response to determining that a network attack has been detected.

11. The ATMS monitor of claim 10, wherein the third sub-monitor is configured to use at least one of signature-based intrusion detection or endpoint detection and response to detect a network attack.

12. The ATMS monitor of claim 11, wherein the ATMS monitor is configured to generate a high priority alert in response to determining that the first, second, and third alerts are generated simultaneously or overlap over a period of time.

13. The ATMS monitor of claim 12, wherein:
the ATMS comprises a plurality of sites, each of the plurality of sites of the ATMS comprising the router and a switch;
the first sub-monitor is configured to establish a first feed to a point between the router and the switch at each site to obtain a respective data packet;
the second sub-monitor is configured to establish a second feed to the router at each site to obtain a respective value of the router; and
the third sub-monitor is configured to establish a third feed to a point between the router and the switch at each site to obtain a respective data packet.

14. A computer-implemented method for monitoring an air traffic management system (ATMS), the method comprising:

15 performing a first sub-monitoring process to monitor a data packet within the ATMS, wherein performing the first sub-monitoring process comprises monitoring for an alteration to the data packet by:

obtaining the data packet from a first site of the ATMS;

hashing the data packet obtained from the first site to obtain a first value;

obtaining the data packet from a second site of the ATMS;

hashing the data packet obtained from the second site to obtain a second value;

comparing the first and second values;

determining the data packet has been altered in response to determining the first and second values do not match; and providing a first alert in response to the alteration of the data packet; and performing a second sub-monitoring process to monitor a router within the ATMS and providing a second alert in response to determining that the router has been altered.

15. The computer-implemented method of claim 14, wherein performing the first sub-monitoring process comprises obtaining the data packet from the first and second site via respective passive taps.

16. The computer-implemented method of claim 14, wherein the method further comprises:

performing a third sub-monitoring process to monitor an endpoint within the ATMS; and providing a third alert a network attack has been detected.

17. A non-transitory computer readable medium comprising instructions that, when executed by at least one processor, cause the at least one processor to:

perform a first sub-monitoring process to monitor a data packet within an air traffic management system (ATMS), wherein:

the instructions that when executed cause the at least one processor to perform the first sub-monitoring process comprise instructions that when executed cause the at least one processor to monitor for an alteration to the data packet; and the instructions that when executed cause the at least one processor to monitor for the alteration to the data packet comprise instructions that when executed cause the at least one processor to:

obtain the data packet from a first site of the ATMS;

hash the data packet obtained from the first site to obtain a first value;

obtain the data packet from a second site of the ATMS;

hash the data packet obtained from the second site to obtain a second value;

compare the first and second values;

determine the data packet has been altered in response to determining the first and second values do not match; and

provide a first alert in response to the alteration of the data packet; and perform a second sub-monitoring process to monitor a router within the ATMS and provide a second alert in response to determining that the router has been altered.

18. The non-transitory computer readable medium of claim 17, further comprising instructions that, when executed by the at least one processor, cause the at least one processor to monitor an endpoint within the ATMS and provide a third alert in response to determining that a network attack has been detected.

19. The non-transitory computer readable medium of claim 17, wherein the instructions that when executed cause the at least one processor to perform the first sub-monitoring process comprise instructions that when executed cause the at least one processor to:

at least one of:

monitor for a delay of the data packet at the first site and at the second site; or monitor for an absence of the data packet at the first site or at the second site; and provide the first alert in response to at least one of the delay of the data packet or the absence of the data packet as detected by the first sub-monitor.

20. The non-transitory computer readable medium of claim 19, wherein:

the instructions that when executed cause the at least one processor to monitor for the delay of the data packet at the first site and at the second site comprise instructions that when executed cause the at least one processor to:

obtain the data packet from the first site of the ATMS;

determine a first timestamp of the data packet obtained from the first site;

obtain the data packet from the second site of the ATMS;

determine a second timestamp of the data packet obtained from the second site;

compare the first and second timestamps; and determine the data packet has been delayed in response to determining that a temporal difference between the first and second timestamps exceeds a predetermined threshold; and the instructions that when executed cause the at least one processor to monitor for the absence of the data packet at the first site or at the second site comprise instructions that when executed cause the at least one processor to:

obtain the data packet from the first site of the ATMS;

determine the data packet cannot be obtained from the second site of the ATMS; and determine the data packet is absent from the second site responsive to the determination that the data packet cannot be obtained from the second site of the ATMS.

* * * * *